United States Patent
Schomaker et al.

(10) Patent No.: US 7,395,630 B2
(45) Date of Patent: *Jul. 8, 2008

(54) STORAGE PLATFORM FOR STORAGE AND WATERING OF PLANTS AND WATERING DEVICE

(75) Inventors: Rudolf Schomaker, Sogel (DE); Reinhold Trinczek, Grabau (DE); Hermann Korte, Surwold (DE)

(73) Assignee: Dipl.-Ing. Permann Korte, Surwold (DE)

( * ) Notice: Subject to any disclaimer, the term of this patent is extended or adjusted under 35 U.S.C. 154(b) by 133 days.

This patent is subject to a terminal disclaimer.

(21) Appl. No.: 10/916,899

(22) Filed: Aug. 12, 2004

(65) Prior Publication Data
US 2005/0055877 A1 Mar. 17, 2005

(51) Int. Cl.
*A47G 7/00* (2006.01)
(52) U.S. Cl. .......................................................... 47/39
(58) Field of Classification Search ............... 47/39, 47/65.5, 79, 83, 66.6, 62 C, 62 E, 18; 108/24; 280/47.35
See application file for complete search history.

(56) References Cited

U.S. PATENT DOCUMENTS

| | | | |
|---|---|---|---|
| 2,654,346 A | 10/1953 | Goff | |
| 3,086,364 A | 4/1963 | Chapin | |
| 3,108,400 A | 10/1963 | Wolfe, Jr. | |
| 3,455,054 A | 7/1969 | Tibbals, Jr. | |
| 3,482,785 A | 12/1969 | Chapin et al. | |
| 3,606,157 A | 9/1971 | Chapin | |
| 3,628,805 A | 12/1971 | Archer et al. | |
| 3,664,063 A * | 5/1972 | Ware | 47/39 |
| 3,772,827 A * | 11/1973 | Ware | 47/39 |
| 3,797,842 A * | 3/1974 | Swick et al. | 280/651 |
| 3,822,672 A | 7/1974 | Janson et al. | |
| 4,163,342 A | 8/1979 | Fogg et al. | |
| 4,250,666 A | 2/1981 | Rakestraw | |
| 4,276,720 A * | 7/1981 | Lyon | 47/39 |
| 4,571,883 A * | 2/1986 | Shaw | 47/65.6 |
| 5,048,462 A | 9/1991 | Hostetler | |
| 5,355,618 A | 10/1994 | Pedersen et al. | |
| 5,673,511 A * | 10/1997 | Holtkamp, Jr. | 47/18 |

(Continued)

FOREIGN PATENT DOCUMENTS

DE 2204583 8/1973

(Continued)

OTHER PUBLICATIONS

French Patent FR 2805965 to Mieulet, Sep. 14, 2001, English Translation, 30 pages.

*Primary Examiner*—Francis T Palo
(74) *Attorney, Agent, or Firm*—Fulbright & Jaworski; Jan K. Simpson

(57) ABSTRACT

A storage tray for storing, watering and transporting plants, the storage tray being shaped like a pan, preferably with side walls, and having an overflow, which may be height-adjustable, for setting a desired liquid level, and a watering device for watering and transporting plants, with at least two storage trays of the invention disposed one on top of the other, the storage trays being arranged such that any liquid running over the overflow of a/each storage tray can flow into a storage tray located beneath it, and in particular the one immediately below.

7 Claims, 14 Drawing Sheets

U.S. PATENT DOCUMENTS

| | | | |
|---|---|---|---|
| 5,826,375 A * | 10/1998 | Black | 47/67 |
| 5,956,893 A | 9/1999 | Harrison | |
| 5,960,827 A | 10/1999 | Rosenberg et al. | |
| 5,987,812 A * | 11/1999 | Knell | 47/39 |
| 6,243,985 B1 * | 6/2001 | Miller | 47/39 |
| 6,470,625 B1 | 10/2002 | Byun et al. | |
| 6,695,231 B2 | 2/2004 | Dramm et al. | |
| 6,793,223 B2 * | 9/2004 | Ondrasik et al. | 280/47.35 |
| 6,820,757 B2 * | 11/2004 | Craft et al. | 211/188 |
| 6,843,022 B1 | 1/2005 | Holley | |
| 6,957,627 B1 | 10/2005 | Knippelmeir | |
| 2002/0029517 A1 | 3/2002 | Hutchinson et al. | |
| 2002/0152677 A1 * | 10/2002 | Park | 47/67 |
| 2002/0189163 A1 | 12/2002 | Cooper | |
| 2004/0035813 A1 | 2/2004 | Sparkowski | |
| 2005/0039390 A1 * | 2/2005 | Sharples et al. | 47/39 |
| 2005/0055877 A1 * | 3/2005 | Schomaker et al. | 47/39 |
| 2005/0081438 A1 * | 4/2005 | Schomaker et al. | 47/39 |

FOREIGN PATENT DOCUMENTS

| | | | |
|---|---|---|---|
| DE | 2800575 | | 7/1978 |
| DE | 3619262 | | 12/1987 |
| DE | 10003837 | | 10/2000 |
| DK | GB 1569405 | * | 6/1980 |
| EP | 0409031 | | 1/1991 |
| EP | 0614794 | | 9/1994 |
| EP | 614794 B1 | * | 2/1998 |
| FR | 2297557 | | 8/1976 |
| FR | 2805965 | | 9/2001 |
| GB | 1569405 | | 6/1980 |

* cited by examiner

STORAGE PLATFORM FOR STORAGE AND WATERING OF PLANTS AND WATERING DEVICE

CROSS-REFERENCE TO RELATED APPLICATIONS

This application claims priority to EP 03018501.1 on Aug. 15, 2003.

TECHNICAL FIELD

The invention relates to a storage tray for storing, watering and transporting plants and a watering device formed therewith.

BACKGROUND OF THE INVENTION

Known storage trays for storing and watering plants usually consist of flat sieve plates, which are reinforced at their edges with angle brackets, for example. Plants are stored on these plates, which are watered by a hose or other watering devices. The water not immediately absorbed by the plants flows over the edge and off the storage tray, as a consequence of which watering is expensive and time-consuming, an unnecessarily large amount of water is consumed, and the plants are nevertheless often watered unsatisfactorily.

For this reason, but also in order to save space, the storage trays are often stacked on top of one another. This can lead to a situation in which, during watering, the water flows out of an upper storage tray into a lower one, which is not without problems, because the plants in the lower storage trays are then watered from above in some cases, which is harmful for many species of plants.

The problem of the invention therefore consists in providing a storage tray which makes it possible to store and water plants inexpensively and in a manner suitable for the species concerned.

BRIEF SUMMARY OF THE INVENTION

This problem is solved in accordance with the invention by a storage tray for storing and watering plants, the storage tray being shaped like a pan and having at least one overflow to determine a desired liquid level. The storage tray can be provided with side walls, such as walls standing perpendicularly to a flat base area of the tray.

It is preferably provided for the overflow to be height-adjustable for setting a desired liquid level.

In addition, it can provided for the overflow to have a tubular drainage member mounted firmly or in a height-adjustable manner in an opening in a floor of the storage tray. The drainage system or the overflow can be height-adjustable, stepwise or infinitely.

The drainage member can have visual marks and/or mechanical locking members in predetermined positions. In addition, the drainage member can have at least one drainage opening pointing to the side, and it can be rotatably mounted in the opening.

It is advantageously provided that the drainage member should have a hose made of an elastic material, the external diameter of which is greater than the diameter of the opening. In this connection, the hose can expand towards the end portion which forms the overflow.

It can be provided that an expansion member, especially an expansion ring, is inserted into the end portion.

It is also preferable that one opening in a side wall of the storage tray should have a height-adjustable sliding member associated with it in order to form the overflow.

It is advantageously provided that the storage tray should have mounting means for attaching to a supporting means, and in particular to struts of a frame, shelf or trolley. The mounting means may be hooks, eyes, projecting pins or rails.

In addition, it is preferably provided that the storage tray should have a rectangular base area.

In a preferred arrangement of the invention, it is provided that the storage tray is rectangular and, on each of two parallel narrow sides, has two mounting members enabling it to be hung in mounting openings in frame struts, each mounting member having an engagement end portion extending along the respective narrow side and ending freely in the direction of the long side located closest in each case.

The engagement end portions of the mounting members are preferably disposed in a corner area of the storage tray in each case. The mounting members may be L-shaped and may have a mounting limb and an insertion limb forming the engagement end portion. It is appropriate for the mounting limbs to be fixed to a side wall.

The engagement end portions are preferably provided with an indentation so that they can be hung in frame struts with a positive fit.

In addition, the invention envisages that the narrow sides between the mounting members are each provided with an enlarged portion, within which is disposed an overflow in each case. In a preferred embodiment, it is provided that the storage tray is provided with rollers on an underside. In addition, it can be provided that the storage tray is designed as the bottom-most storage tray of a watering device, that it is rectangular and is provided in each corner area with a receiving means for a frame strut.

The problem described above is also solved in accordance with the invention by a watering device for storing, watering and transporting plants with at least two storage trays of the invention disposed one on top of the other, the storage trays being arranged such that any liquid running over the overflow of a/each storage tray can flow into a storage tray located beneath it, and in particular the one immediately below.

It can be provided for the storage trays to be designed and arranged such that the tubular drainage member of an/each upper storage tray extends right down to a floor of a storage tray located beneath it, and in particular the one immediately below.

It can be provided for a/each storage tray to be mounted directly on a storage tray located beneath it, i.e. without there being any separate frame or the like present.

Alternatively, it can be provided for the watering device to have a supporting means, especially a frame, shelf or trolley.

It is advantageously provided for the supporting means to have mounting means for attaching storage trays.

In an appropriate design, the mounting means are hooks, eyes, projecting pins or rails.

As a variant, the invention further provides that the storage trays, when seen from above, are arranged in a fan-like shape or in the form of a pyramid.

A further embodiment of the watering device provides that there are at least two storage trays present, the frame struts each having at least one insertion indentation for hanging in the engagement end portions, the insertion recesses in each case facing each other from a narrow side of the frame struts associated with the storage trays. It is convenient for the frame struts to be L or U-shaped or rectangular profiles, or alternatively tubular profiles.

BRIEF DESCRIPTION OF THE DRAWINGS

The invention will now be explained by means of a working embodiment, with reference to a drawing in which.

DETAILED DESCRIPTION OF THE INVENTION

Figure 1:
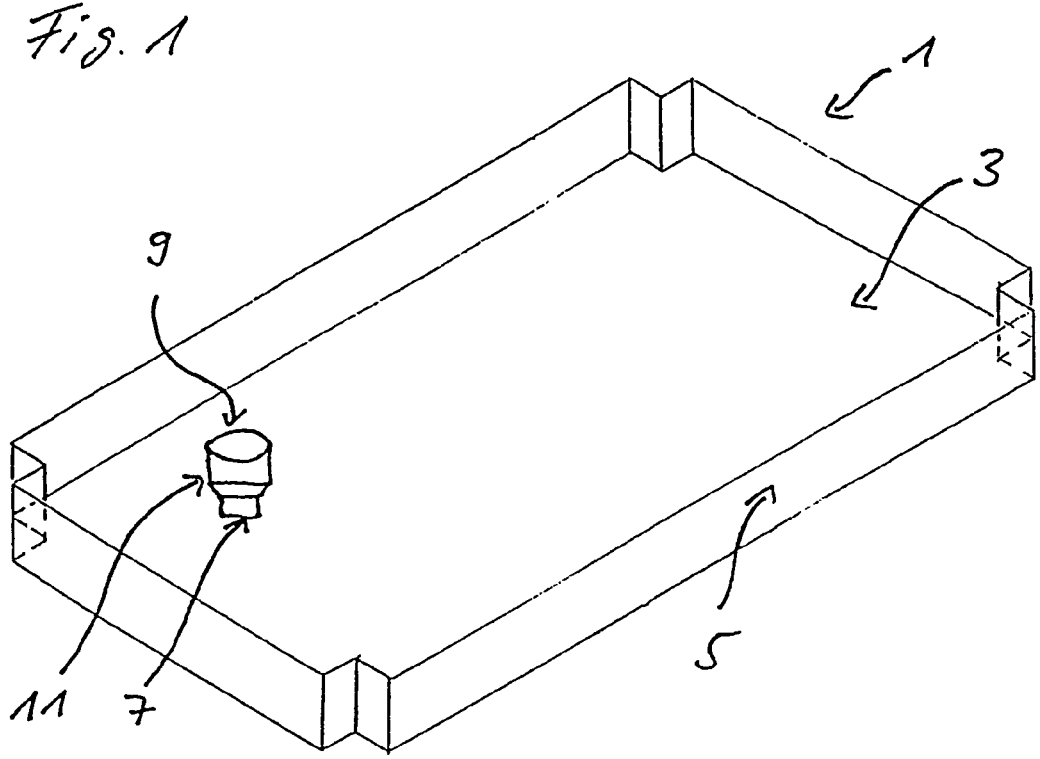
FIG. 1 shows a perspective view of a first embodiment of a storage tray of the invention.

FIG. 1 shows a first embodiment of a storage tray of the invention, indicated as a whole by 1. The storage tray 1 has a flat floor 3 and side walls 5 arranged perpendicularly thereto. In an opening 7 in the floor 3, there is a height-adjustable overflow 9, which could alternatively be held firmly in the opening 7.

Figure 2:
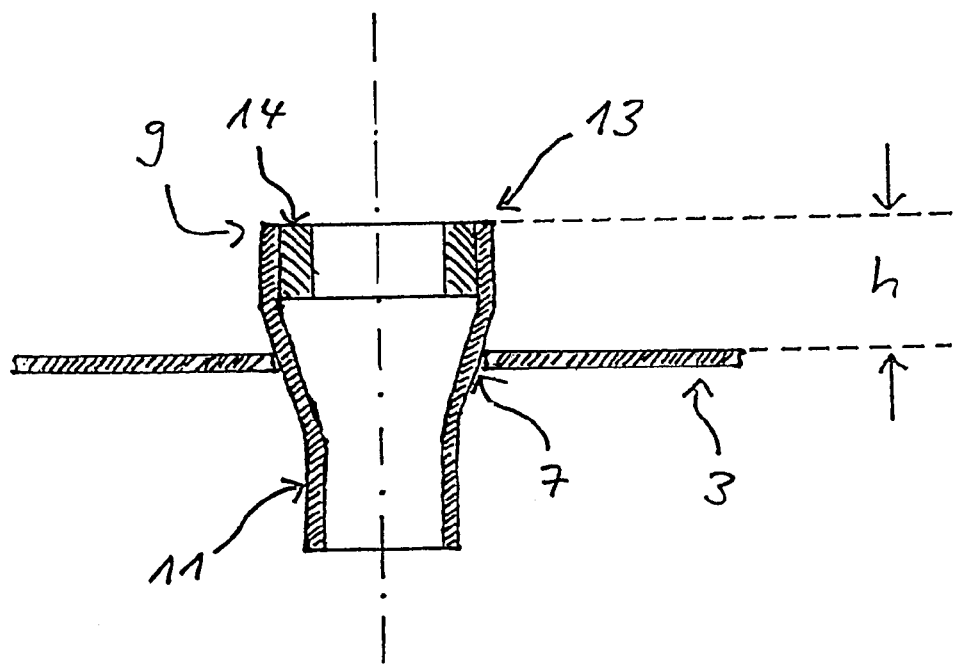
FIG. 2 shows a longitudinal section of a first embodiment of an overflow of the storage tray.

The overflow 9 is shown in detail in FIG. 2. It has a drainage member 11 which, in this embodiment, takes the form of an elastic hose. The hose 11 is flared towards the end portion 13 forming the overflow, so that it is prevented from moving downwards. The enlarged portion of the hose 11 is created by an expansion member, e.g. a brass ring 14, which is inserted into the hose 11.

The elasticity of the hose 11 makes it possible, within certain limits, to adjust the height of the upper hose opening, which in effect forms the overflow 9, while still preserving a seal. If the hose 11 is pushed upwards in the opening, the place where the opening 7 is in contact with the hose 11 is shifted away from the end portion 13. Because of the elasticity of the hose 11, this means that there is an enlarged portion of the hose in the region of the new position of the opening 7 and thus a new seal is created. If, on the other hand, the hose 11 is pushed downwards, the place where the opening 7 is in contact with the hose 11 is shifted in the direction of the end portion 13. This causes the hose 11 to be elastically constricted in the region of the new position of the opening 7. The enlargement and constriction when the position is changed, and thus the adaptability of the diameter of the hose to the diameter of the opening 7 allow the hose 11 to be retained and to create a seal at different height positions. In this way, the height of the hose opening 13 and thus the level h of any liquid that is poured into the storage tray 1 can be adjusted to a certain extent, and the hose cannot drop out of the bottom, because of the enlarged portion.

Instead of an enlarged portion in the region of the opening 7, the hose 11 can have a constant external diameter over a certain length in this region, though this then has to be slightly larger than the diameter of the opening 7, in order to enable the (elastic) hose 11 to be retained in the opening 7 where it fits, creating a seal, and to allow the height to be adjusted by sliding the hose 11 in the opening 7.

Alternatively, the drainage member (see also FIG. 5 below) can take the form of a plastic or metal tube, which is retained in an opening in the floor of the storage tray to create a seal. The tube can have an external diameter which is slightly larger than the diameter of the opening, so that the tube is retained in the opening by friction and the height of the overflow edge can be adjusted by pushing or pulling the tube. The area between the tube and the opening can additionally be sealed by an appropriate sealing means.

In a further alternative, the height-adjustable overflow takes the form of a sliding member located in an opening in the side wall of the storage tray. When a desired, pre-set level is exceeded, the water flows over an overflow edge of the sliding member and out through the opening. The sliding member can be a plate, for example, which is guided by rails formed on the edge of the opening. The sliding member is height-adjustable and can be engageable in desired positions. Seals of rubber or plastic can be provided in an area between the sliding member and the opening.

The storage tray 1 can be made of plastic, for example, which may be reinforced with fibers, or of a corrosion-resistant metal or a suitable composite material.

Figure 3:
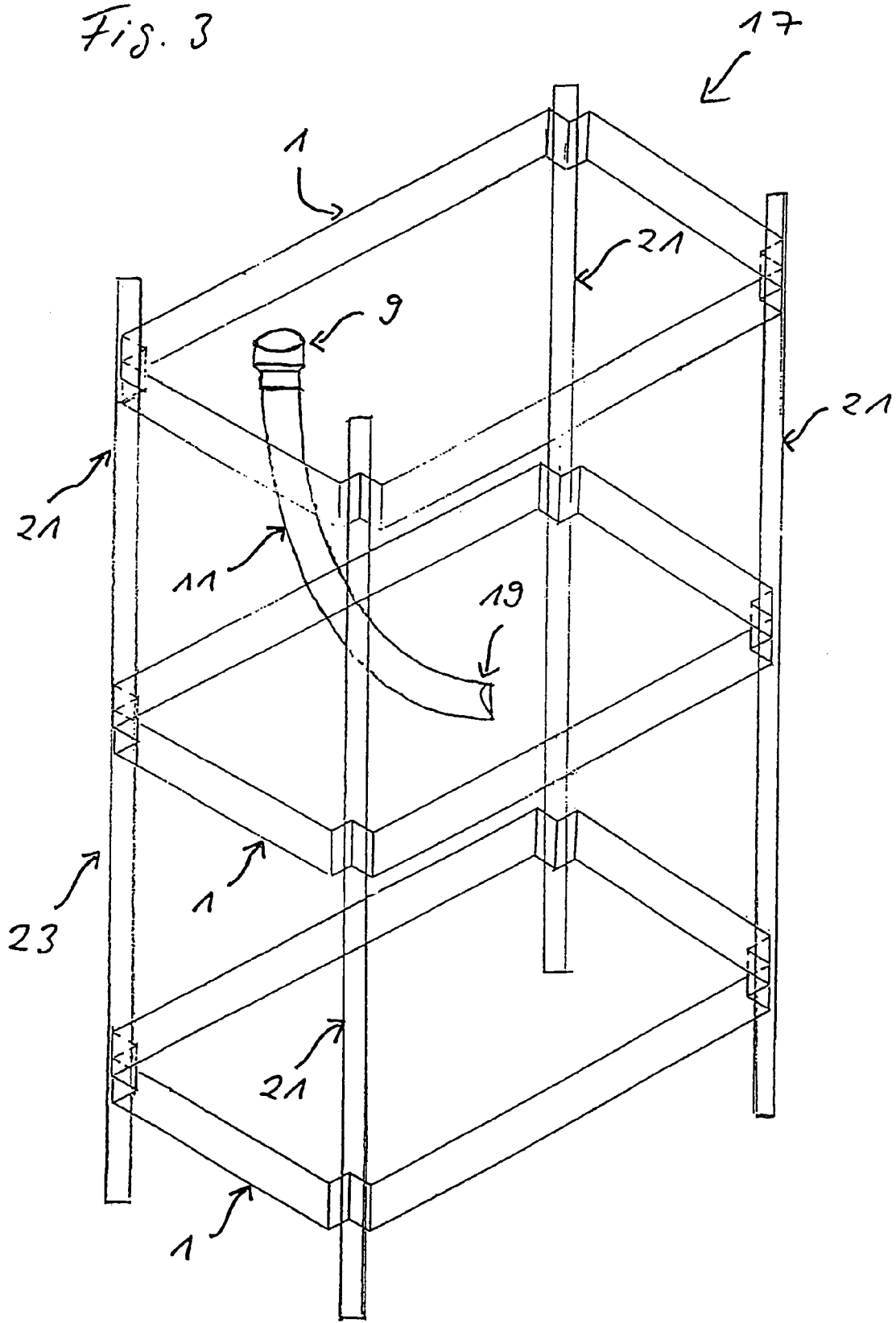
FIG. 3 shows a perspective view of a first embodiment of a watering device of the invention.

FIG. 3 shows an embodiment of a watering device 17 of the invention, in which three storage trays 1 of the invention are arranged one on top of the other on frame struts 21 of a frame 23. Each storage tray 1 has an overflow 9 provided with a hose 11 leading downwards, FIG. 3 merely showing one hose by way of example. The free end portion 19 of the hose 11 distal to the overflow 9 ends on or just above the floor 3 of the storage tray 1 immediately below. The hose 11 retained in the upper storage tray can also end above the floor of the storage tray 1 immediately below. The hose 11 of the bottom-most storage tray 1 can lead to a drain or to a storage container so that further use can be made of the liquid (for example water with additives such as fertilizer or the like).

Figure 4:
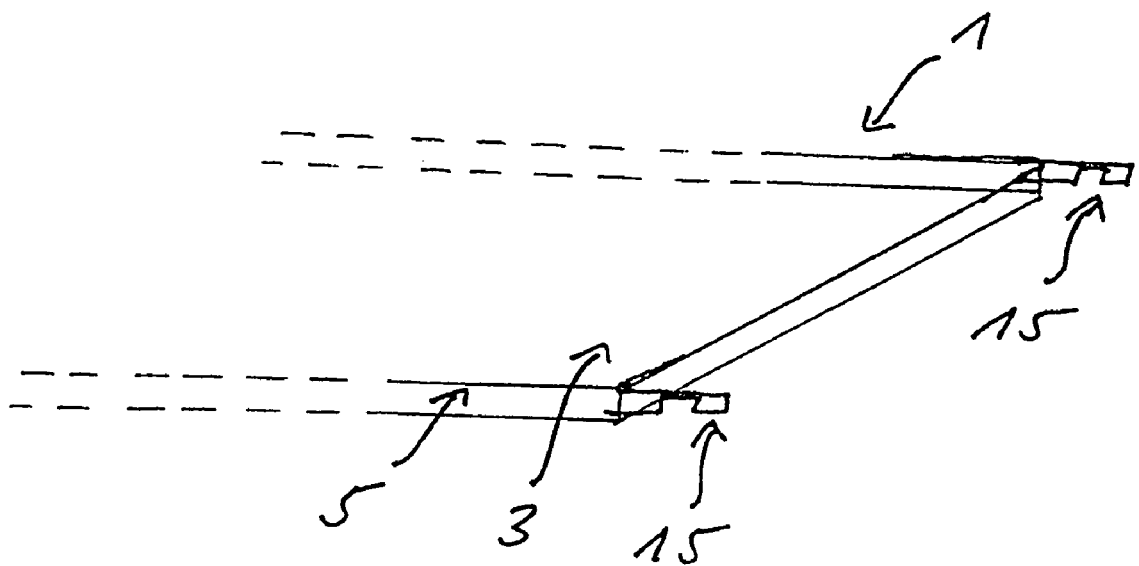
FIG. 4 shows a storage tray according to FIG. 1 (indicated by dashed lines) with insertion hooks.

As indicated in FIG. 4, the storage trays have mounting means, e.g. hooks 15, projecting towards the front in the longitudinal direction on narrow sides of the rectangular storage tray. These, co-operating with corresponding recesses or projecting pins (not shown) on the frame struts 21, enable the three storage trays 1 to be releasably attached to the frame struts 21 of the frame 23 of the watering device 17. A height-adjustable attachment arrangement (stepwise or at regular intervals) is appropriate.

On the storage tray 1 according to FIGS. 1 to 4, the mounting means 15 shown are arranged in a conventional manner, i.e. in the same way as known storage trays, which are flat in design and have no overflow. By means of the arrangement of hooks 15 on the narrow sides projecting in the longitudinal direction, the storage trays 1 are hung in a frame 23 in accordance with FIG. 3, by first inserting two hooks 15, which are located on a common narrow side of a storage tray, in corresponding recesses in two adjacent frame struts 21 and pushing them in as far as possible. In this position, the hooks 15 of the opposite narrow side of the storage tray can be moved into alignment with corresponding retaining openings in the opposite frame struts 21 of the frame and inserted into them by moving the storage tray in the longitudinal direction, until all four hooks 15 are located approximately the same depth in said four recesses in the frame struts 21. In this position, recesses in the hooks 15 indicated in FIG. 4 can lock in the recesses in the frame struts 21 in a positive fit, so that the storage tray is fixed in its desired position.

Because of the hooks 15 extending in the longitudinal direction of the storage tray and the resultant movement of inserting the storage tray in its longitudinal direction, it is necessary that the corner areas of the storage tray should remain a certain distance from the frame struts 21 when inserted, to allow for maneuvering, i.e. at least in the corner areas it should be somewhat shorter than the longitudinal clearance between the frame struts, so that the above-mentioned insertion process can be performed. As will be explained again below in connection with FIGS. 13 and 14, this is not necessary in the case of a different embodiment of the mounting means in accordance with FIGS. 6 to 8.

The storage trays 1 can also be stacked one on top of the other in a staggered manner, e.g. stepwise or fan-like or in the form of a pyramid, which is particularly suitable for exhibition or advertising purposes. In this case, the hoses of the storage trays are in each case guided in such a way that they direct the water running out of a storage tray 1 into a lower storage tray, especially the one immediately below. Storage trays containing cacti, for example, or other plants that need little or no water can be left out in the process.

The watering device 17 can have a mobile base, especially in the form of rollers, which may, for example, be attached to the bottoms of the struts 21.

Figure 5:
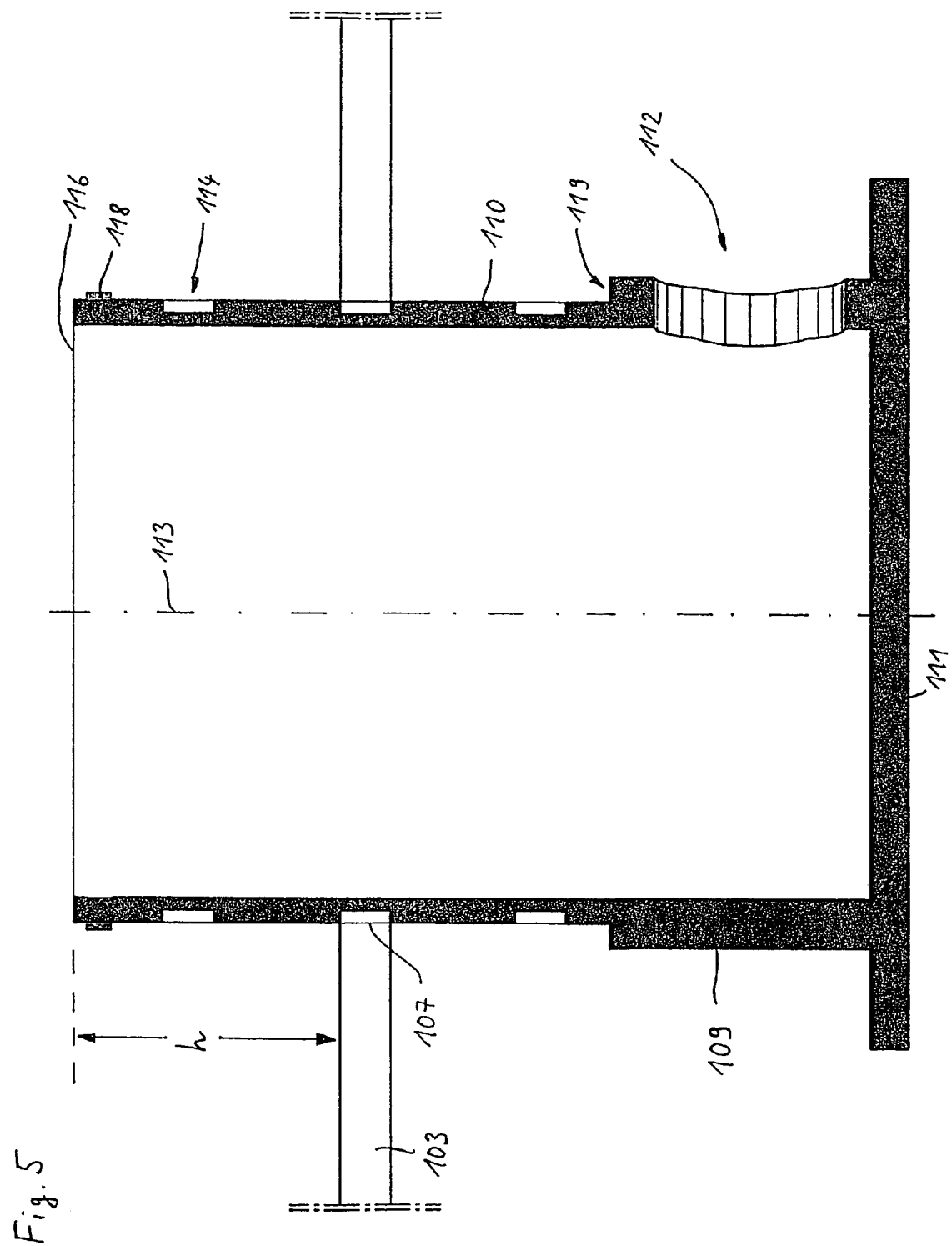
FIG. 5 shows a sectional view of a second embodiment of an overflow.
Figure 6:
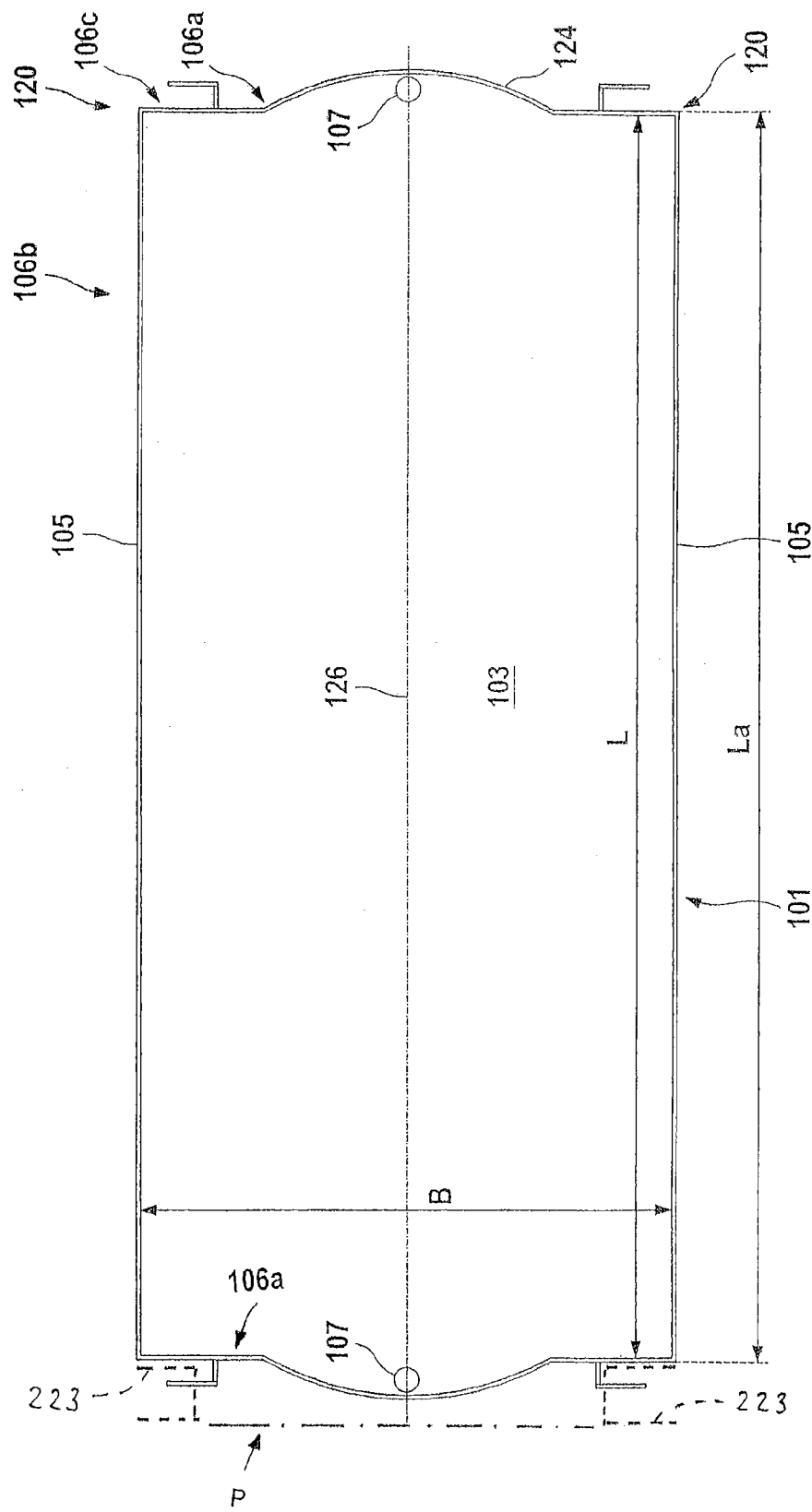
FIG. 6 shows a top view of a second embodiment of a storage tray of the invention.
Figure 7:
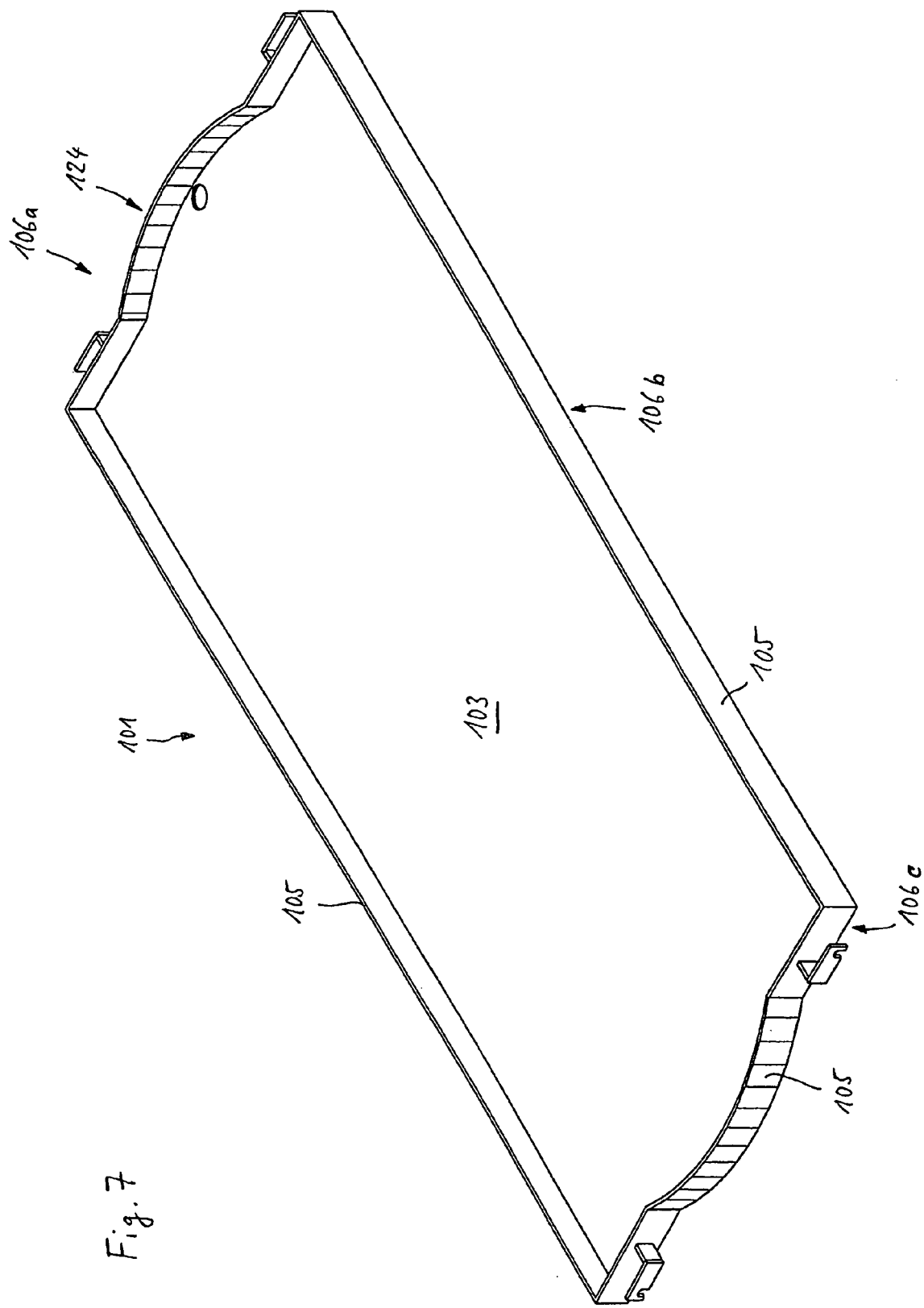
FIG. 7 shows a perspective view of the storage tray of FIG. 6.

FIG. 5 shows a further embodiment of an overflow or drainage member 109 inserted into an opening 107 in a floor 103, such as in a further embodiment of a storage tray 101, which is shown in more detail in FIGS. 6 and 7.

The overflow 109 consists of a cylindrical base element 110 open at the upper end and terminating at a lower end with a circular floor panel 111. A drainage opening 112 allows water to drain away which flows into the cylindrical base element 110 from above over an edge 116. By rotating the overflow 109 about its longitudinal axis 113, it is possible to determine the direction of the drainage opening 112 and thus the direction in which the water flows out. In this way, it is possible to ensure that the stream of water strikes a storage tray located beneath it. A locking device or a limitation of the angle of rotation can also be provided. It goes without saying that a plurality of drainage openings 112 are also possible, which are distributed about the periphery of the base element 110.

As FIG. 5 also shows, the base element 110 is provided, on its outer side, with a number of engagement elements 114 (recesses or projections), which make it possible to adjust the height at predetermined distances, i.e. so that the upper edge 116 of the base element 110 is located at a desired height h above the floor 103, as a result of which a maximum water level or height h on the floor is laid down.

Instead of the engagement elements 114, visual marks can also be provided, which make it easier to set a desired height h. In the region of the upper rim 116 a catch 118 is provided, which prevents the overflow 109 from being pulled completely out of the opening 107 or at least renders it difficult. A shoulder 119 determines a maximum level that can be set (overflow 109 pushed to the very top).

Because of the catch 118, even when the overflow 109 is lowered completely, a small amount of water is always left standing in the storage tray. If it is desired to drain off the rest completely, this can be done by arranging a notch in the overflow and/or by providing an indentation in the floor 103 in the region of the opening 107. In addition, it can be provided that the floor 103 is curved or vaulted so that, first of all, greater stability is achieved and, secondly, a slope is created, so that the water always runs in the direction of the overflow (s). This ensures that the storage tray can be emptied completely and is virtually free of water when removed.

Figure 8:
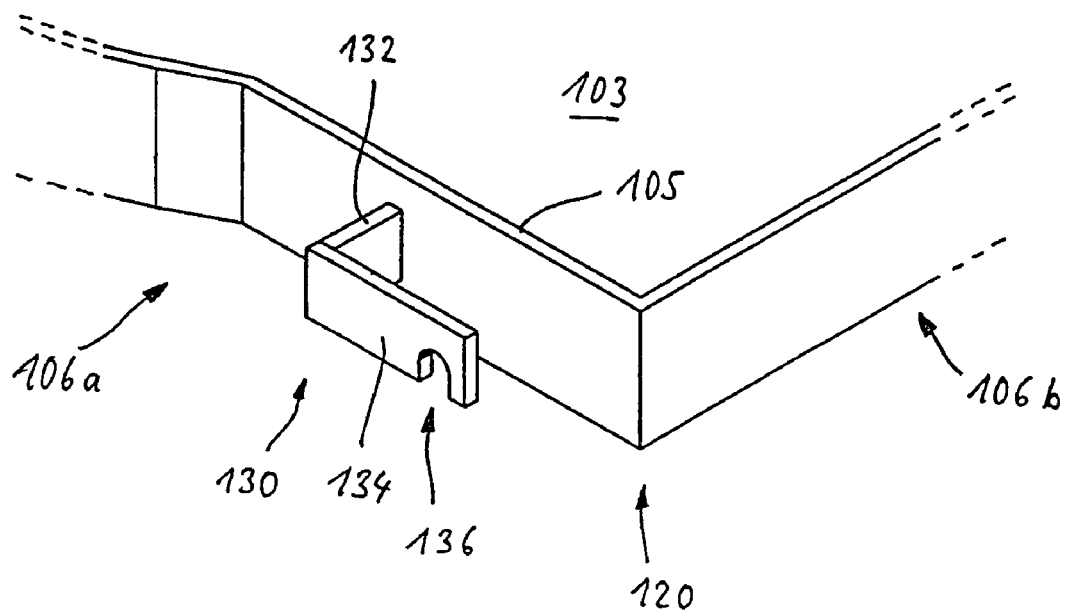
FIG. 8 shows an enlarged part of the storage tray of FIGS. 6 and 7.
Figure 9:
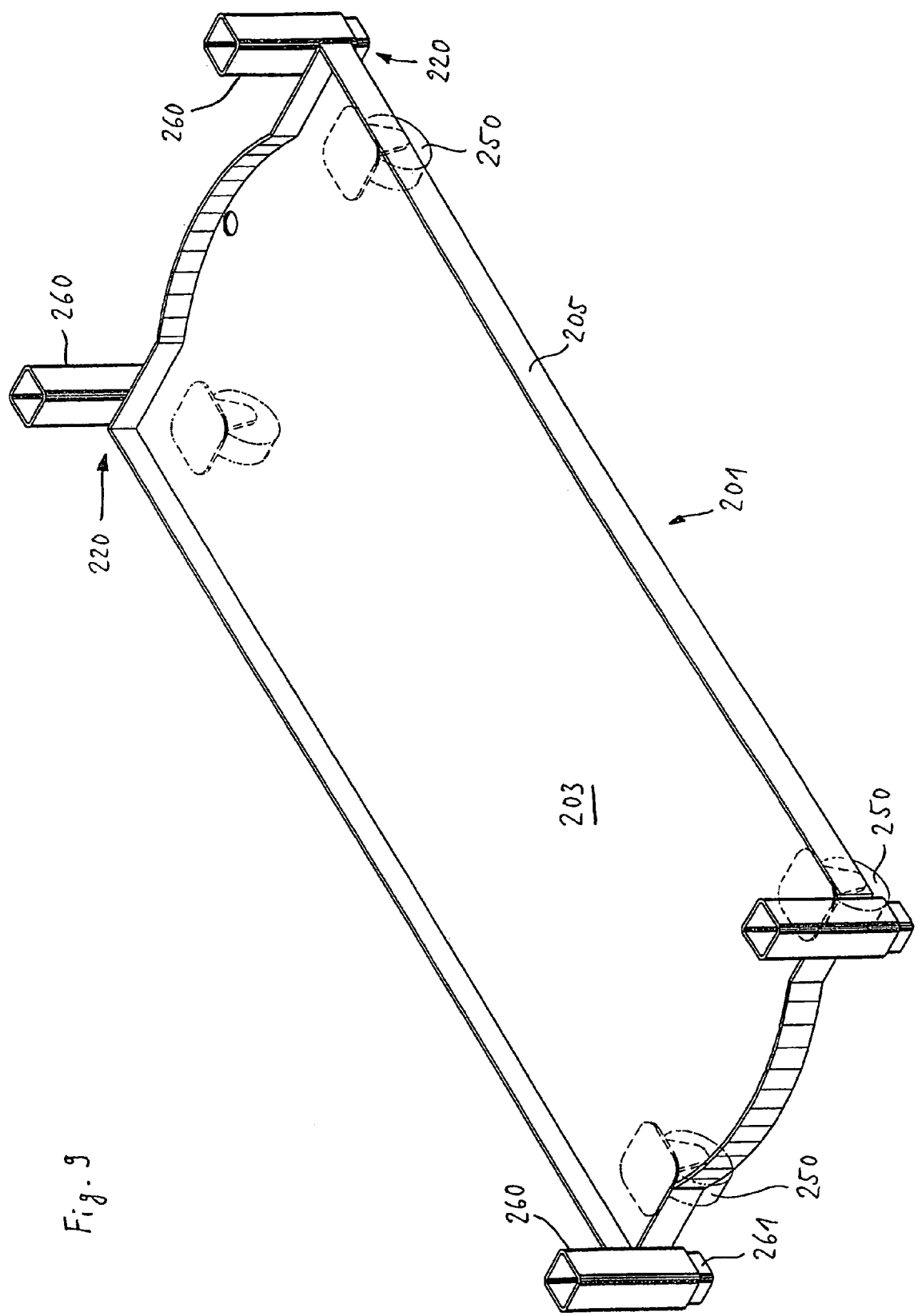
FIG. 9 shows a perspective view of a further embodiment of a storage tray of the invention.
Figure 10:
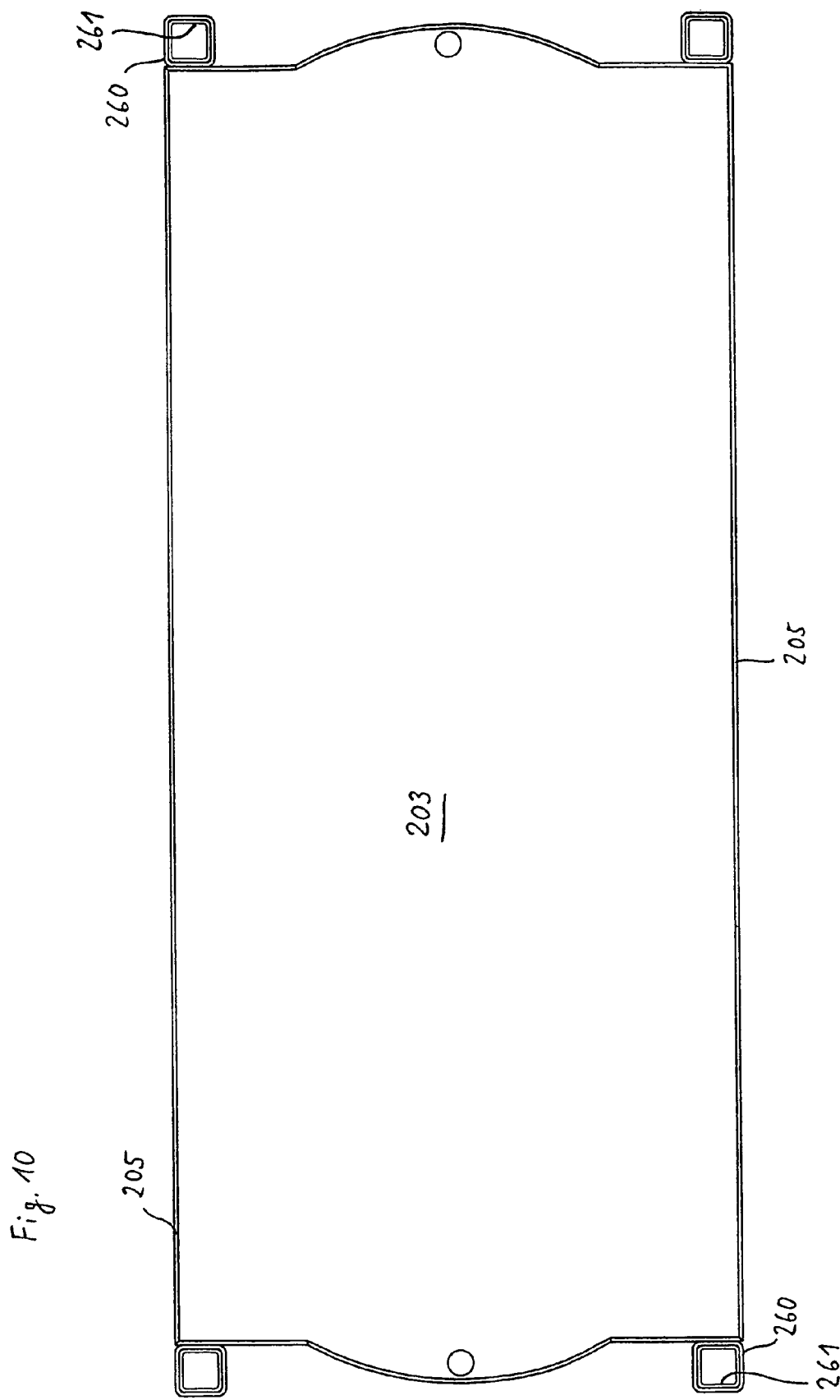
FIG. 10 shows a top view of the storage tray of FIG. 8.

FIGS. 6 to 8 illustrate the structure of a second embodiment of a storage tray of the invention 101. The storage tray 101 is rectangular as a whole, with a floor 103, side walls 105, long sides 106b and narrow sides 106a, corners 120 and two openings 107, in which are located overflows 109 (not shown), for example in accordance with FIG. 5. In the region of each of the narrow sides 106a an enlarged portion 124 is provided, within which is the opening 107. The enlarged portion 124 is arcuate in the embodiment shown, but it could also be any other shape, such as rectangular, triangular or some other shape. The purpose of the enlarged portion 124 is to enable the opening 107 or the overflow 109 to be placed outside a rectangular storage area with dimensions L×B, which is defined by the long sides 106b and straight portions 106c of the narrow sides 106a or, to put it another way, by the corners 120 of the storage tray 101 (length, width of the inner standing surface of the storage tray). FIG. 6 also shows the enlarged portion 124 the the tray 101 extending within a space confined by the narrow side wall 106a of the tray 101 and a plane P contacting the outside surfaces of two frame struts 223 adjacent to the narrow side 106a of the tray 101. The outside surfaces face away from the narrow side 106a.

The enlarged portion 124 could also begin directly at the corners 120 of the storage tray 101, the rectangular storage area then being defined by the corner points of the storage tray. The decisive point in this connection is that arranging the overflow 109 within said rectangular storage area of the storage tray would be disadvantageous. The reason for this is that plant pots are usually placed on the storage tray in shared rectangular boxes holding, for example, six individual plant pots in each case, the length of said boxes being equal to the width B of the storage tray and the width of said boxes corresponding to an integral fraction of its length L. An arrangement of this kind is only possible within said rectangular storage area. On the other hand, the length L of the storage area is itself predetermined in practice by the fact that the dimensions of and relative distances between frame struts in a watering device in accordance with FIG. 3 (see also FIGS. 13 to 15 below) are defined by a large number of watering devices already in existence. Indirectly, the dimensions L, B of the storage tray are also predetermined in this way, within which there should not be any overflow.

As is illustrated by FIGS. 6 and 7, and especially by FIG. 8 on an enlarged scale, there are mounting members 130 disposed on the side walls 105 in the region of the narrow sides 106a of the storage tray 101 in the area of the corners 120, or near the long sides 106b, which are L-shaped in the embodiment shown and have a mounting limb 132 attached to the side wall 105, and an insertion limb 134 which extends from the mounting limb and ends freely in the direction of the nearest long side 106b and perpendicular thereto and parallel to the narrow side 106a associated with it. As is shown in particular in FIG. 8, the insertion limb 134 has a semi-circular or slot-shaped indentation 136 so that the storage tray 101 can be hung in frame struts of a watering device in a manner that will be explained below.

Figure 11:
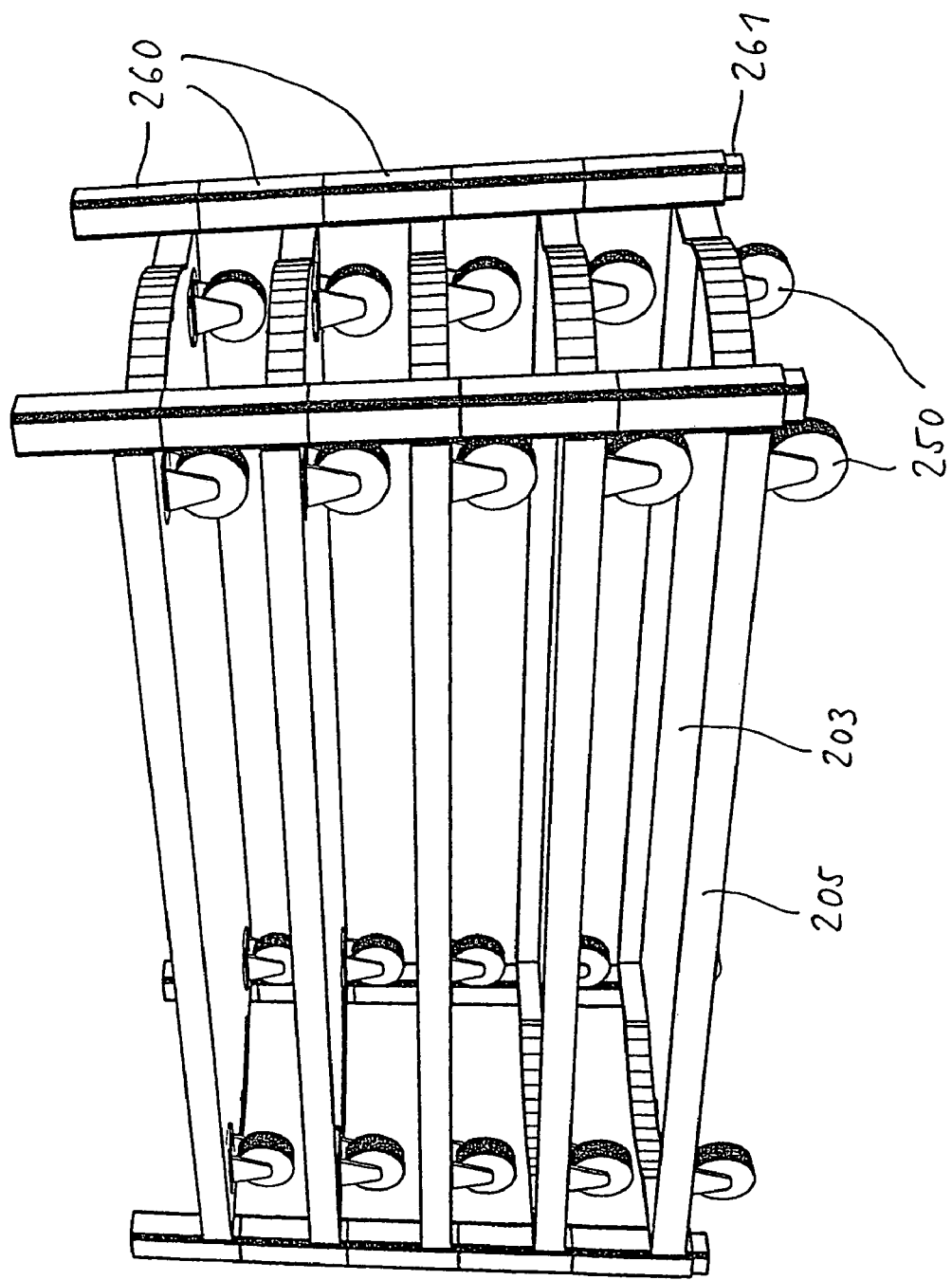
FIG. 11 shows a perspective view of several storage trays according to FIGS. 9 and 10 stacked one on top of the other.
Figure 12:
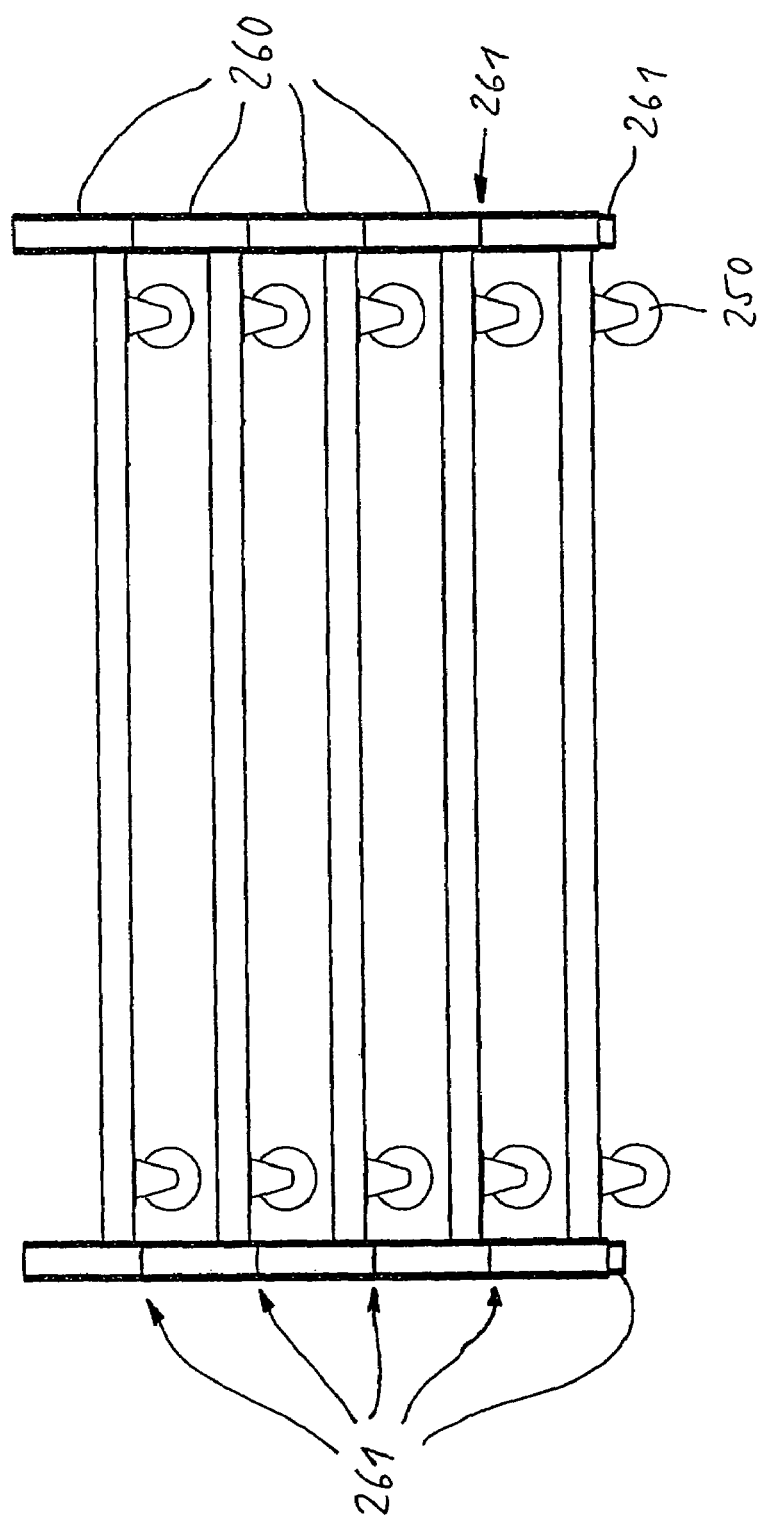
FIG. 12 shows a side view corresponding to FIG. 10.
Figure 13:
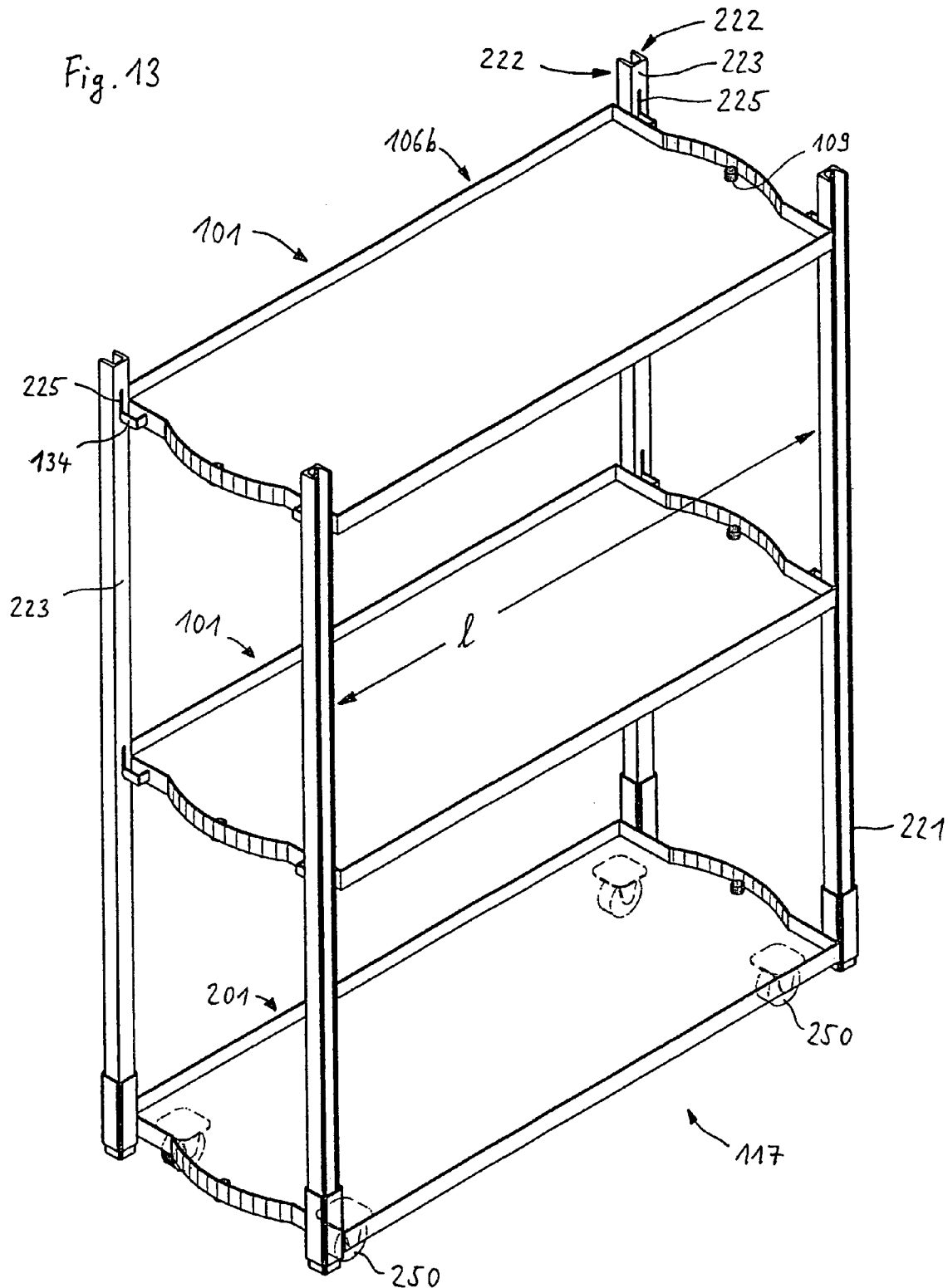
FIG. 13 shows a perspective view of a second embodiment of a watering device of the invention.
Figure 14:
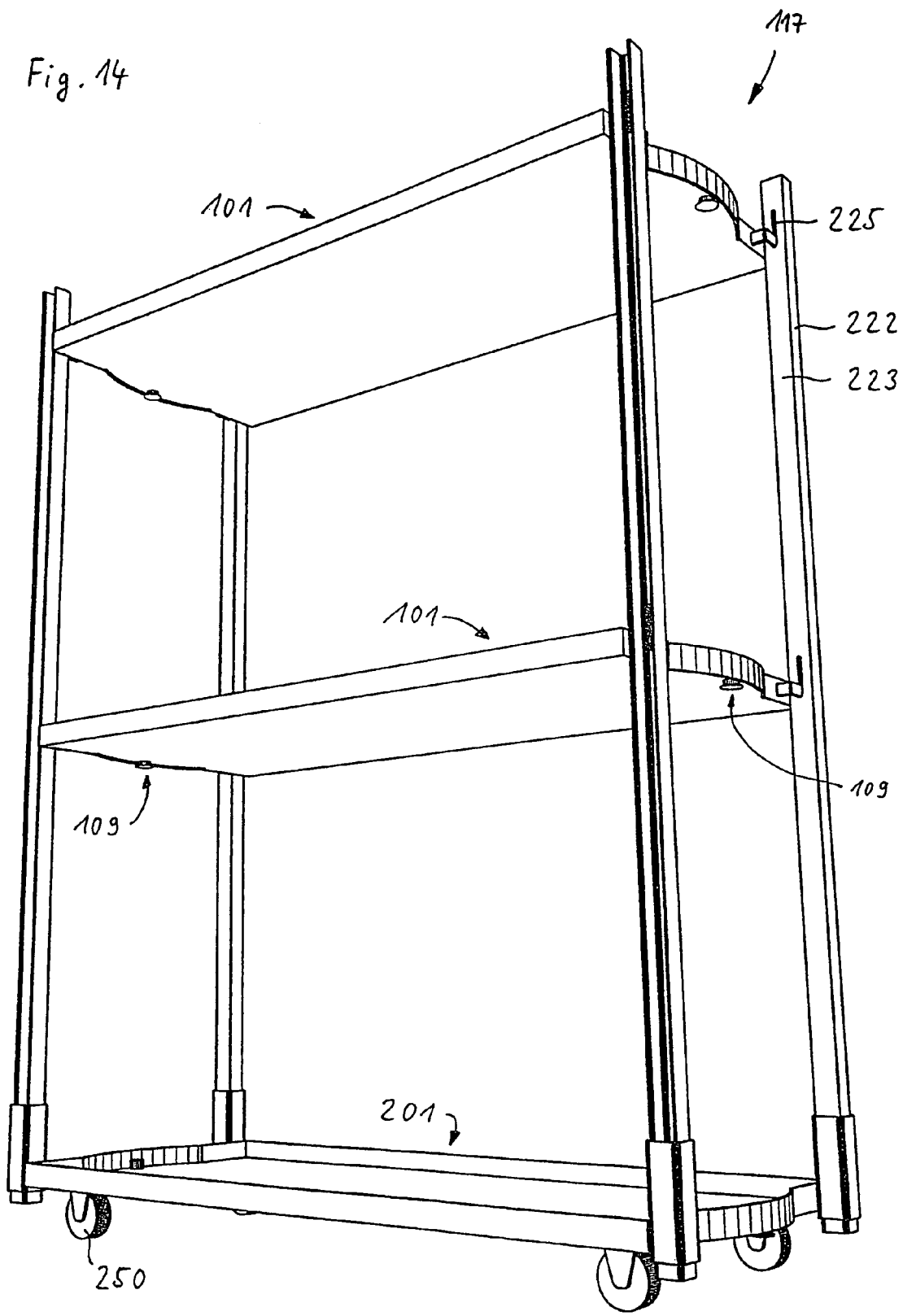
FIG. 14 shows the watering device of FIG. 13 seen from a different angle.
Figure 15:
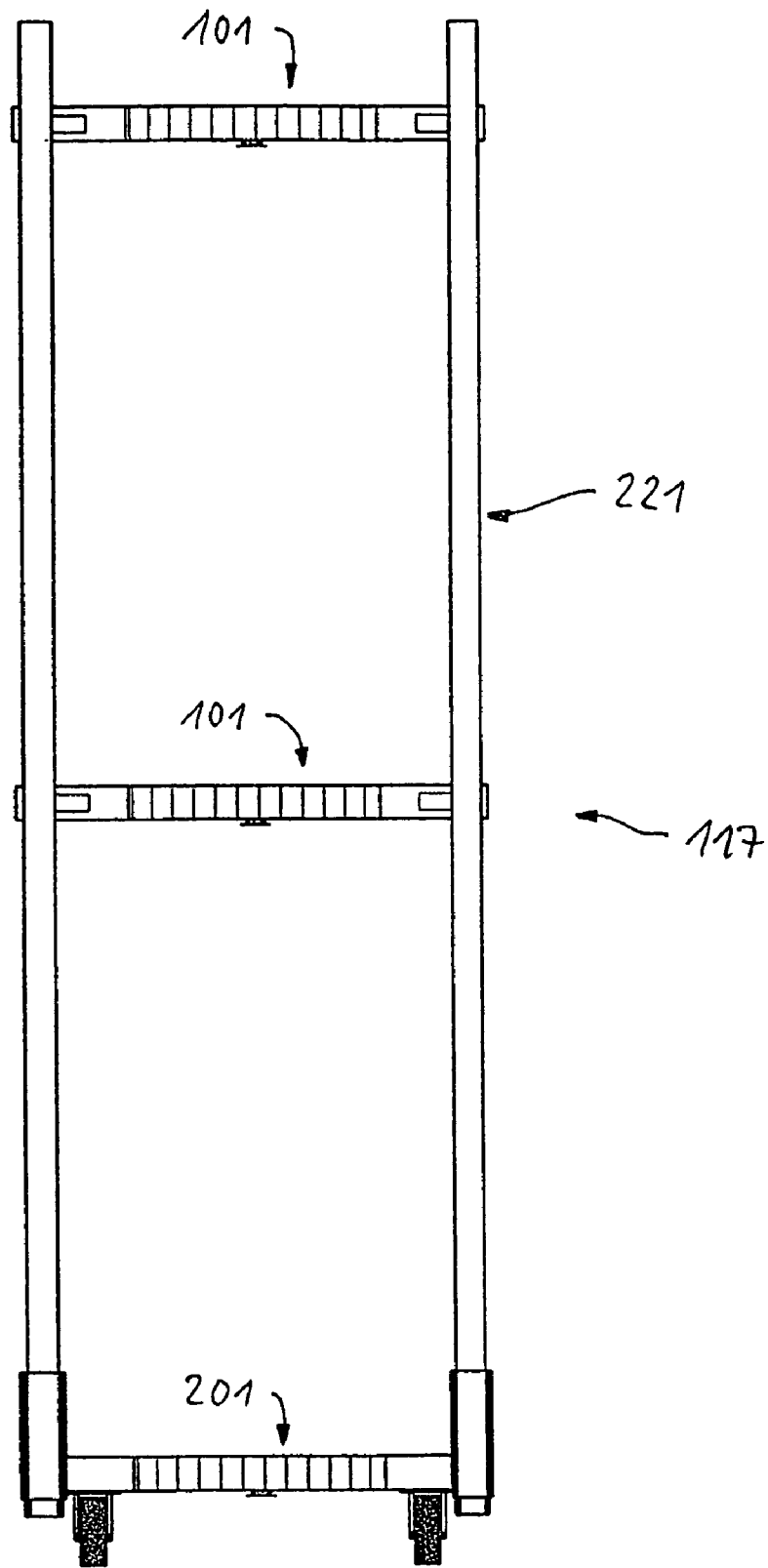
FIG. 15 shows the watering device of FIGS. 13 and 14 in a front view.

FIGS. 9 to 12 illustrate a further embodiment of a storage tray of the invention 201, which, unlike the storage tray 101 according to the first embodiment, is provided first of all with rollers 250 attached to the underside of its floor 203 and secondly, in the region of each corner 220, with a receiving means 260 for a frame strut 221 (which will be explained below and is shown in FIGS. 13 to 15). The receiving means 260 in this example are square tubes attached to the floor 203 and side walls 205, into the lower part of which are inserted stop members 261 in the form of smaller and shorter pieces of square tube, the external contours of which correspond to the internal contours of the square tubes 260. On the one hand, this measure creates a stop for a frame strut 221 pushed into the receiving means 260 from above, where an external contour of the frame strut corresponds substantially to the internal contour of the receiving means 260 or at least fits into it, and, on the other hand, the portions of the stop members 261 projecting downwards enable the storage trays 201 to be stacked, as is shown in FIGS. 11 and 12. It goes without saying that the receiving means 260 could be of some different shape, e.g. in order to receive frame struts of non-square cross-sections (rectangular, L-shaped, round or some other shape).

FIGS. 13 to 15 show different views of a further embodiment of a watering device of the invention 117, with a lowest storage tray 201 in accordance with FIGS. 9 to 12, two storage trays 101 in accordance with FIGS. 6 to 8 and four frame struts 221 inserted into the receiving means 260 of the lowest storage tray 201.

As shown in particular in FIGS. 13 and 14, the frame struts 221 are designed as U-shaped profiles, the shape of the cross-section, or external contour, of which is square (web and limbs of same length), so that they can be inserted into the receiving means 260 with little play, the stop members 261 establishing a defined insertion depth. The rectangular tube sections 261 forming the stop members can, for example, be inserted just as deeply into the receiving means 260 as they project from them.

As FIGS. 13 and 14 also show, the frame struts 221 are inserted in such a way that limb portions 222 point outwards, i.e. in the direction of the long sides 106b of the storage trays 102, 201, while the web portions 223 of the frame struts 221 linking the limb portions 222 are disposed substantially parallel to the long sides 106b and thus facing one another. In order to achieve the advantages of the invention, however, it irrelevant whether limb portions 222 or web portions 223 are disposed facing one another, since the decisive aspect is only that a corresponding portion of the material of a frame strut 221 should be available in the region the insertion limbs 134 of the mounting members 130 for insertion. To this end, the web portions 223 are in each case provided, at a desired height, with insertion slots 225 running perpendicularly or in the longitudinal direction of the struts, into which the insertion limbs 134 are inserted. In the process, the recesses 136 encompass the wall thickness of the material of the web portions 223.

Alternatively, the U-shaped frame struts 221 shown in FIGS. 13 and 14 could be rotated by 90° about their longitudinal axis compared to the position shown, if the insertion slots 225 were inserted into the limb portions 222 which would then be pointing towards one another. An insertion position rotated by 180° would only be possible after a corresponding alteration, i.e. lengthening, of the insertion limb 134, though such an arrangement would be less favorable, because the ends of the insertion limb 134 would then be projecting outwards.

In contrast to the process of inserting a storage tray according to FIGS. 3 and 4, as described earlier on, a storage tray 101 is in this case inserted in the transverse direction, i.e. such that, initially, two insertion limbs 134 associated with a common long side 106b of a storage tray are pushed into corresponding insertion slots 225, then the insertion limbs 134 opposite a longitudinal axis 126 of the storage tray 101, which are associated with the other long side 106b, are placed at the same height as the corresponding, opposite insertion slots 225 and pushed into them. In this case, it is clear that no manipulation space is necessary between the front end portions, or the narrow sides 106a, of the storage tray and the frame struts.

Compared to an arrangement as shown in FIGS. 3 and 4, for example, in which mounting members 15 are disposed in the longitudinal direction (parallel to the long sides the storage tray), the advantage of the watering device illustrated in FIGS. 13 to 15 is that the external longitudinal dimension La of the storage trays 101 (FIG. 6) can correspond exactly, in the region of the straight portions 106c of the narrow sides 106a, to the internal clearance 1 between the frame struts 221, without the need to provide a space between the narrow sides 106a of the storage trays 101 and the frame struts 221, to make it possible to insert the storage trays, as is necessary, for example, in an embodiment in accordance with FIGS. 3 and 4, in which the mounting members run in the longitudinal directions of the storage tray.

The length gain achieved in this way in a storage tray of the invention and in the above-mentioned storage area can be several centimeters and means that, with a predetermined clearance 1 between the frame struts 221, several plant containers more can be placed on each individual storage tray 101 than is the case with an arrangement as in FIGS. 3 and 4, for example, in which the trays are inserted in the longitudinal direction.

In a conventional storage tray without side walls 105, such considerations play a subordinate role, since, with that kind of construction, the space available between the frame struts 221 with longitudinal dimension 1 can usually be exploited completely, because there are no side walls 105 present and plant containers standing on the storage tray can project slightly over the floor the storage tray on the narrow sides, which is not possible in a storage tray of the invention because of the side walls 105.

The storage tray or its useful standing surface (L×B) can also be approximately or exactly square, though the increase in the actually useful standing surface L×B compared to the state of the art is less pronounced in this case, because of the arrangement of the mounting members in accordance with the invention, than in a storage tray with a greater length-width ratio, e.g. where L/B=2 or more. The useful standing surface is enlarged, compared to the state of the art, as a consequence of the invention to the extent that strip-shaped areas located between frame struts which are adjacent in the longitudinal or transverse directions when seen from the top are different sizes and either form part of the useful standing surface or not, the cross-sectional shape of the frame struts (square or rectangular-oblong) also playing a role here.

LIST OF REFERENCE NUMERALS

1 Storage tray
3 Floor
5 Side wall
7 Opening
9 Overflow
11 Drainage member (hose)
13 End portion
14 Expansion member (brass ring)
15 Mounting means (hooks)
17 Watering device
21 Frame strut
23 Frame
101 Storage tray
103 Floor 105 Side wall
106a Narrow side
106b Long side
106c Straight section
107 Opening
109 Overflow (drainage member)
110 Cylindrical base element
111 Floor panel
112 Drainage opening
113 Longitudinal axis
114 Locking member/mark
116 Upperedge
117 Watering device
118 Catch
119 Shoulder
120 Corner (of 101)
124 Enlarged portion
126 Longitudinal axis (of 101)
130 Mounting member
132 Mounting limb
134 Insertion limb
136 Indentation
202 Storage tray
203 Floor
220 Corner
217 Watering device
221 Frame strut
222 Limb portion
223 Web portion
225 Insertion slot (insertion indentation)
250 Roller
260 Receiving means
261 Catch
h Level
L Internal length (of 101, 201)
La External length (of 101, 201)
1 Clearance (of 221)

What is claimed is:

1. A watering device for storing, watering and transporting plants, comprising:
 a base element having a rectangular floor and four sidewalls;
 four receiving means having rectangular cross sectional area provided in each corner area of the base element;
 four vertical frame struts in the form of U-shaped or rectangular profiles fitted into the receiving means, said frame struts having mounting means in the form of a series of insertion indentations;
 at least one rectangular storage tray having a floor, two narrow side walls, two long side walls and four mounting members fixed to said tray for hooking in said frame struts, each mounting member is L-shaped and extends outwardly from a portion of the narrow side walls such that a long side of the L-shape is parallel to the narrow side wall, a free end of the L-shape forms has an engagement end portion for insertion into said frame struts, the engagement end portion faces in the direction of the adjacent long side wall, the floor in the region of a narrow sidewall having an enlarged portion projecting beyond said narrow sidewall;
 an overflow to determine a desired liquid level being arranged within said enlarged portion;
 wherein the arrangement is such that the enlarged portion of each tray extends within a space confined by the narrow side wall of the tray and a plane contacting outside surfaces of two frame struts adjacent to the narrow side of the tray, said outside surfaces facing away from said narrow side.

2. The watering device as claimed in claim 1, wherein the overflow is stepwise or height-adjustable for setting a desired liquid level.

3. The watering device as claimed in claim 1, wherein the overflow includes a drainage member.

4. The watering device as claimed in claim 1, wherein the drainage member is rotatably mounted in an opening in the floor of the base element and/or in the floor of the storage tray.

5. The watering device as claimed claim 1, wherein the mounting members have a mounting limb and an insertion limb forming the engagement end portion.

6. The watering device as claimed in claim 1, wherein the watering device is provided with rollers on an underside.

7. The watering device as claimed in claim 1, comprising at least two storage trays disposed one on top of the other, the storage trays being arranged such that any liquid running over the overflow of a/each storage tray can flow into a storage tray located beneath it, and in particular the one immediately below.

* * * * *

UNITED STATES PATENT AND TRADEMARK OFFICE
CERTIFICATE OF CORRECTION

PATENT NO. : 7,395,630 B2  Page 1 of 1
APPLICATION NO. : 10/916899
DATED : July 8, 2008
INVENTOR(S) : Rudolf Schomaker et al.

It is certified that error appears in the above-identified patent and that said Letters Patent is hereby corrected as shown below:

On the Title Page, Item (73) should read,
Assignee: Dipl.-Ing. Hermann Korte, Surwold (DE)

Signed and Sealed this

Twenty-sixth Day of August, 2008

JON W. DUDAS
*Director of the United States Patent and Trademark Office*